United States Patent
Pavelski et al.

(10) Patent No.: US 7,117,452 B1
(45) Date of Patent: Oct. 3, 2006

(54) SYSTEM AND METHOD FOR CUSTOMIZING WORKSPACE

(75) Inventors: Frank Alan Pavelski, Boxborough, MA (US); William Stephen Andreas, Marlborough, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/337,538

(22) Filed: Jun. 22, 1999

Related U.S. Application Data

(60) Provisional application No. 60/112,204, filed on Dec. 15, 1998.

(51) Int. Cl.
*G06F 3/00* (2006.01)

(52) U.S. Cl. ............... 715/792; 715/764; 715/788; 715/798; 715/800; 715/799; 715/765; 715/762

(58) Field of Classification Search ........... 345/764, 345/792, 788, 798, 800, 799, 765, 762, 806, 345/783, 760, 744, 747; 715/764, 792, 788, 715/798, 800, 799, 765, 762, 806, 783, 760, 715/744, 747

See application file for complete search history.

(56) References Cited

U.S. PATENT DOCUMENTS

| | | | |
|---|---|---|---|
| 4,891,770 A | 1/1990 | Hollett ............... 364/521 |
| 5,072,412 A | 12/1991 | Henderson, Jr. et al. |
| 5,163,130 A | 11/1992 | Hullot |
| 5,214,756 A | 5/1993 | Franklin et al. |
| 5,226,117 A | 7/1993 | Miklos |
| 5,325,481 A | 6/1994 | Hunt |
| 5,371,847 A | 12/1994 | Hargrove |
| 5,390,295 A | 2/1995 | Bates et al. ............ 395/157 |
| 5,434,964 A | 7/1995 | Moss et al. |
| 5,553,281 A | 9/1996 | Brown et al. ............ 395/600 |
| 5,583,981 A | 12/1996 | Pleyer |
| 5,603,034 A | 2/1997 | Swanson |
| 5,659,693 A | 8/1997 | Hansen et al. |
| 5,689,665 A | 11/1997 | Mitsui et al. |
| 5,734,380 A * | 3/1998 | Adams et al. ............ 345/781 |
| 5,745,910 A | 4/1998 | Piersol et al. ............ 707/515 |
| 5,754,174 A | 5/1998 | Carpenter et al. |

(Continued)

OTHER PUBLICATIONS

Using Microsoft FrontPage 97, QUE.*

(Continued)

*Primary Examiner*—Weilun Lo
*Assistant Examiner*—Mylinh Tran
(74) *Attorney, Agent, or Firm*—Pillsbury Winthrop Shaw Pittman, LLP

(57) ABSTRACT

A system, method, and computer readable medium creating a custom frameset within at least one non-based computer application. The system enables a user to customize a view containing a plurality of documents in frames, the documents may include web documents and non-web documents, using predefined framesets. A graphical user interface may be provided that presents a user with various options relating to predefined framesets. The user may select one or more options relating to various attributes of each frame within a predefined frameset including the number, size, and orientation, to customize the layout of the view. The user may then specify one or more attributes to be assigned to each frame. The predefined frameset may then be customized according to the user's selection(s). The options may also include enabling users to divide the view into individual frames. The user may also be presented with one or more graphical user interfaces which present the user with various options that may be customized for a particular view.

24 Claims, 5 Drawing Sheets

U.S. PATENT DOCUMENTS

| | | | |
|---|---|---|---|
| 5,781,785 A | 7/1998 | Rowe et al. | 395/774 |
| 5,796,402 A | 8/1998 | Ellison-Taylor | 345/342 |
| 5,808,610 A | 9/1998 | Benson et al. | |
| 5,835,091 A | 11/1998 | Bailey et al. | |
| 5,838,317 A | 11/1998 | Bolnick et al. | 345/339 |
| 5,841,434 A | 11/1998 | Arda et al. | |
| 5,854,628 A | 12/1998 | Nakagawa | |
| 5,874,958 A | 2/1999 | Ludolph | 345/339 |
| 5,920,315 A | 7/1999 | Santos-Gomez | 345/342 |
| 5,923,885 A | 7/1999 | Johnson et al. | 395/712 |
| 5,970,468 A | 10/1999 | Bull | 705/11 |
| 5,978,828 A | 11/1999 | Greer et al. | 709/2.24 |
| 6,008,809 A | 12/1999 | Brooks | 345/342 |
| 6,014,137 A * | 1/2000 | Burns | 345/334 |
| 6,038,567 A | 3/2000 | Young | 707/103 |
| 6,141,007 A | 10/2000 | Lebling et al. | 345/339 |
| 6,144,991 A | 11/2000 | England | 709/205 |
| 6,151,622 A | 11/2000 | Fraenkel et al. | 709/205 |
| 6,154,756 A | 11/2000 | Hearn et al. | 707/530 |
| 6,195,094 B1 | 2/2001 | Celebiler | 345/339 |
| 6,205,549 B1 | 3/2001 | Pravetz | 713/182 |
| 6,211,875 B1 * | 4/2001 | Lin et al. | 345/808 |
| 6,239,798 B1 | 5/2001 | Ludolph et al. | 345/340 |
| 6,266,684 B1 * | 7/2001 | Kraus et al. | 707/513 |
| 6,275,225 B1 | 8/2001 | Rangarajan et al. | 345/333 |
| 6,285,364 B1 | 9/2001 | Giordano, III et al. | 345/347 |
| 6,289,361 B1 | 9/2001 | Uchida | 707/501 |
| 6,301,586 B1 * | 10/2001 | Yang et al. | 707/104.1 |
| 6,310,631 B1 | 10/2001 | Cecco et al. | 345/792 |
| 6,335,743 B1 | 1/2002 | Owlings | 345/801 |
| 6,336,124 B1 | 1/2002 | Alam et al. | 707/523 |
| 6,389,437 B1 | 5/2002 | Stoub | 707/523 |
| 6,389,458 B1 | 5/2002 | Shuster | 709/213 |
| 6,393,605 B1 | 5/2002 | Loomans | 717/121 |
| 6,405,224 B1 | 6/2002 | Van Der Meer | 707/513 |
| 2002/0004805 A1 | 1/2002 | Nojima et al. | 707/520 |
| 2002/0054052 A1 | 5/2002 | Sharma et al. | 345/700 |
| 2002/0188758 A1 | 12/2002 | Nakajima et al. | 709/245 |

OTHER PUBLICATIONS

Patent Office, East tool, 1990-1998.*
"*HTML Tutorial—Frames*," printed Apr. 8, 1999, 9 pages.
U.S. Appl. No. 09/337,419, Frank Alan Pavelski et al., filed Jun. 22, 1999.
U.S. Appl. No. 09/337,420, Frank Alan Pavelski et al., filed Jun. 22, 1999.
Chapter Eighteen, "Frames: Pages with Split Personalities", *Microsoft Front Page 98*, copyright 1997 by Sams.net Publishing, pp. 359-381.
Shafran, "Teach Yourself Microsoft Front Page 98 in 24 Hours", copyright 1997 by Sams.net Publishing, pp. 183-198.
McDonald, John, "Acrobat 3.0", downloaded from internet http://www.hmug.org/Reviews/Acrobat3.0/, copyright by The Huntsville Macintosh Users Group 1997, pp. 1-15.
VMI Version 5.0 printout, copyright Feb. 19, 1998, pp. 1-13.
"Extensions to HTML", SoftQuad HoT Metal PRO 3.0, copyright 1996, pp. 69-86.

* cited by examiner

SYSTEM AND METHOD FOR CUSTOMIZING WORKSPACE

RELATED APPLICATIONS

This application claims priority based on U.S. Provisional Patent Application Ser. No. 60/112,204, entitled "System and Method for Customizing Workspace Using Custom Framesets," filed Dec. 15, 1998. This application is also related to co-pending U.S. patent applications entitled, "System and Method for Customizing Workspace Using Custom Framesets," Ser. No. 09/337,419, filed Jun. 22, 1999 and "System and Method for Customizing Workspace Using Custom Framesets Specifying Content and Location," Ser. No. 98/337,420, filed Jun. 22, 1999.

FIELD OF THE INVENTION

The invention relates to a system for enabling system users to select predefined framesets to customize a view with frame content from web documents and non-web documents.

BACKGROUND OF THE INVENTION

Web browser applications exist for presenting pages of content to users over a network, such as the World Wide Web connected over the Internet. Existing web browser applications present certain pages using frames. In these applications, a frame is a portion of the page that contains a web document. Web documents are generally understood to be documents created using a mark-up language, such as HTML, for example. Pages containing frames are defined by a frameset that provides the instructions to the web browser application regarding how to present the various frames in a window in the user's display.

The frameset generally defines the number of frames, the size of the frame and the relative positioning of the frames within the window. In existing systems, a page designer creates a frameset by generating code, such as a mark-up language, that specifies the number of frames, the size of each frame and contents of the frames for the frameset. The frameset is then stored on a server that is accessed by users over the network through the web browser application.

In some existing systems, users that retrieve a frame-based page may resize the frames within the window of the web browser application such that one frame may be reduced to enlarge the size of another frame or set of frames. Further, users may be able to specify which web document is contained within certain frames within the window through the web browser application. Existing systems do not enable users to generate other modifications.

Further, existing systems are limited to presentation of pages of frames in a web-based computer applications, such as web browser applications. Current non-web browser applications are generally limited to a view which is generated by a computer application. A user is not given the option of customizing a view presented by a non-web-based computer application. These and other drawbacks exist.

SUMMARY OF THE INVENTION

An object of the present invention is to overcome these and other drawbacks in existing systems.

Another object of the present invention is to provide a system and method for enabling a user to customize a layout of a view of a computer application containing non-web documents by selecting predefined framesets.

Another object of the present invention is to provide a system and method for enabling a user to customize the layout of a view of a computer application containing non-web documents by selecting the number of frames to be presented in a predefined frameset.

Another object of the present invention is to provide a system and method for enabling a user to customize the layout of a view of a computer application containing non-web documents by selecting the size of the frames to be presented in a predefined frameset.

Another object of the present invention is to provide a system and method for enabling a user to customize the layout of a view of a computer application containing non-web documents by selecting the orientation of the frames to be presented in a predefined frameset.

These and other objects of the invention are achieved according to various embodiments of the invention. According to one embodiment, a system, method, and computer readable medium comprising computer readable program code embodied therein are provided that enable a user to customize a view containing a plurality of documents in frames, wherein the documents may comprise web documents and non-web documents, using predefined framesets. A graphical user interface may be provided that presents a user with various options relating to predefined framesets. The user may select one or more options relating to, for example, various attributes of each frame within a predefined frameset including the number, size, and orientation, to customize the layout of the view. The user may then specify one or more attributes to be assigned to each frame. The predefined frameset may then be customized according to the user's selection(s). The options may also include enabling users to divide the view into individual frames. The user may also be presented with one or more graphical user interfaces which present the user with various options that may be customized for a particular view.

The system may execute this functionality through one or more objects within the system. The system may include a framed view presenting object for presenting a view containing a plurality of frames to a user, at least one frame containing a non-web document. A frame manipulation object for enabling a user to input a manipulation request to manipulate one or more attributes of one or more frames may be used to assign particular attributes to one or more of the frames. A frame modification object may be used to modify the view according to the manipulation request by assigning the attributes input by a user to the frames.

These and other objects, features, and advantages of the invention will be readily apparent to those having ordinary skill in the pertinent art from the detailed description of the preferred embodiments with reference to the appropriate figures.

DETAILED DESCRIPTION OF THE PREFERRED EMBODIMENTS

According to one embodiment of the invention, a system, method, and computer readable medium are provided for creating customized framesets for use in displaying various sources of information in a user interface system, such as a computer monitor. Through selection of various arrangements of frames and options for customizing the frames, a frameset having a preferred layout and content may be created, in any size, geometry, and location, and containing information from any desired source. The contents of each frame may be specified to include web documents or non-web documents. The frameset may then be stored for later retrieval and use.

In order to do so, the user first selects the frameset arrangement for the view. The user then selects the content of the various frames in the frameset, including web documents and non-web documents. A user may also then manipulate the attributes of the frames within the frameset before then saving the frameset for use with that or another view. According to one embodiment, the user may select the frameset arrangement from predefined frameset arrangements stored by the system. A plurality of predefined framesets may comprise different frame arrangements for each of a plurality of different number of frames. The user may then choose the desired number of frames and a predefined frameset from those stored. Other methods of selecting the frameset arrangement may also be used.

Figure 1:
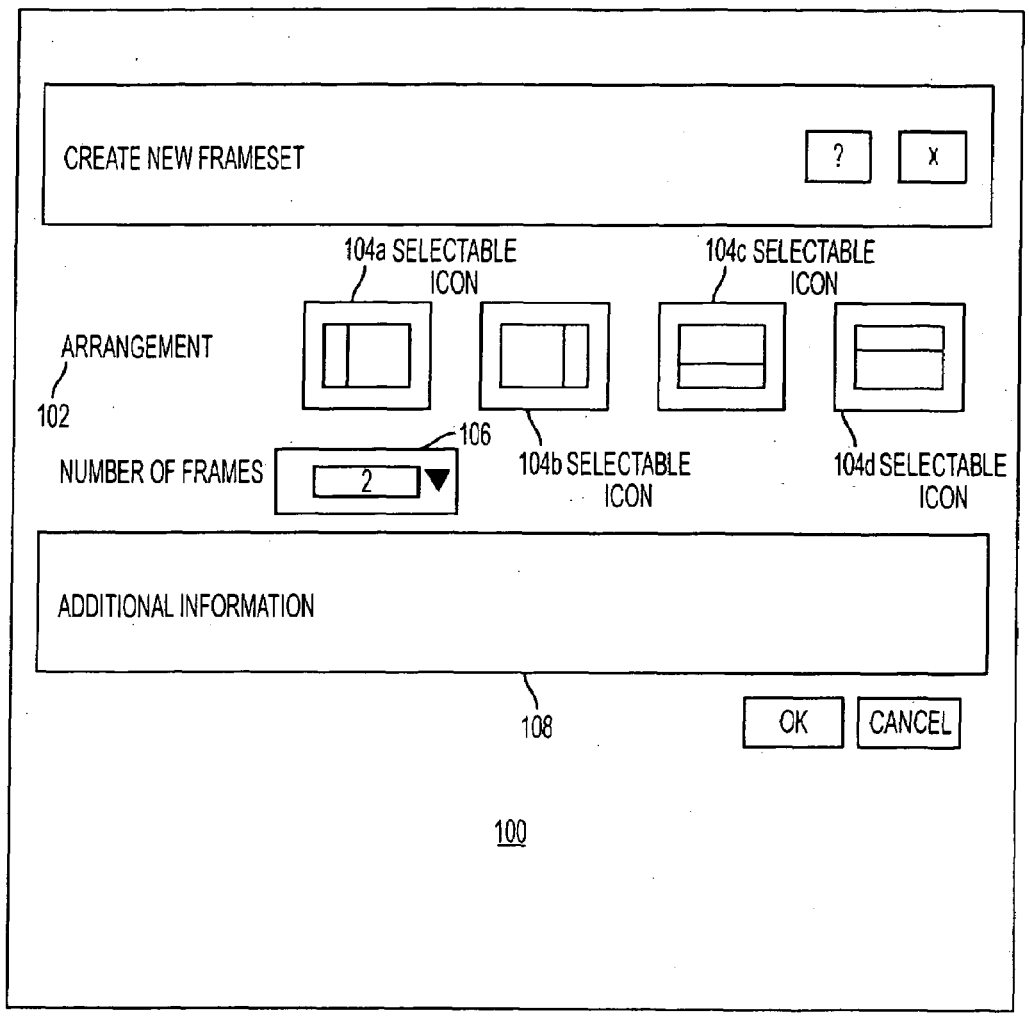
FIG. 1 is a schematic diagram of a frameset creating view in accordance with one embodiment of the present invention.

A "Create New Frameset" window 100 for creating a new frameset in accordance with one embodiment of the invention is illustrated in FIG. 1. Window 100 may comprise an arrangement field 102 for enabling a user to select a basic arrangement of frames for a view from a plurality of predetermined arrangements. For example, arrangement field 102 may comprise selectable icons 104a–104d. Selectable icons 104a–104d may depict various predefined arrangements for a frameset to be created. The predefined arrangements depicted in selectable icons 104a–104d may be based on a number of frames selected in the "Number of frames" field 106 also displayed within window 100. Number of frames field 106 may be used to enable a user to select the number of frames within the frameset to be created. For example, a user may enter 2, 3, or 4 to create a frameset having 2, 3, or 4 frames, respectively. Other methods for selecting the various options may also be used. For example, number of frames field 106 may include a pull-down menu providing a list of numbers to choose from. Also, the user may enter a number using voice recognition software, or by other mechanisms.

Figure 1A:
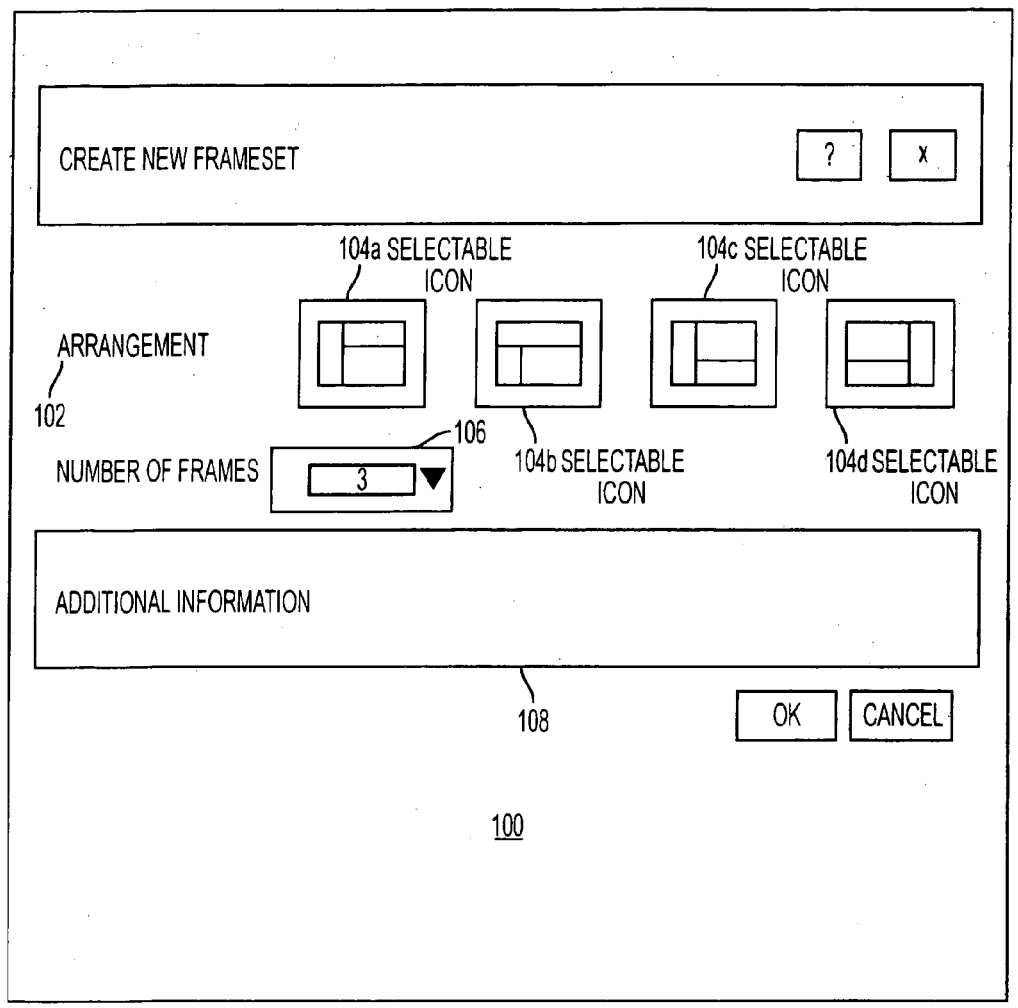
FIG. 1A is a schematic diagram of a frameset creating view in accordance with another embodiment of the present invention.

Depending on the number of frames selected by a user, selectable icons 104a–104d may display predefined arrangements in accordance with the number of frames selected. For example, if a user inputs a "2" into number of frames field 106, selectable icons 104a–104d may depict predefined arrangements comprising a narrow frame column to the left of a wide frame column, a wide frame column to the left of a narrow frame column, a narrow frame row above a wide frame row, and a narrow frame row below a wide frame row or various other configurations. If a user inputs, for example, a "4" or "5" into number of fields frame 106, selectable icons 104a–104d depicting various layouts of framesets which include either four (4) or five (5) frames. For example, if a user selects 3 as the number of frames, then the predefined arrangements depicted in FIG. 1A may be provided.

Window 100 may also include an additional information field 108. Additional information field 108 may be used, for example, to display information explaining how to use the information displayed in window 100 or other types of information.

Figure 2:
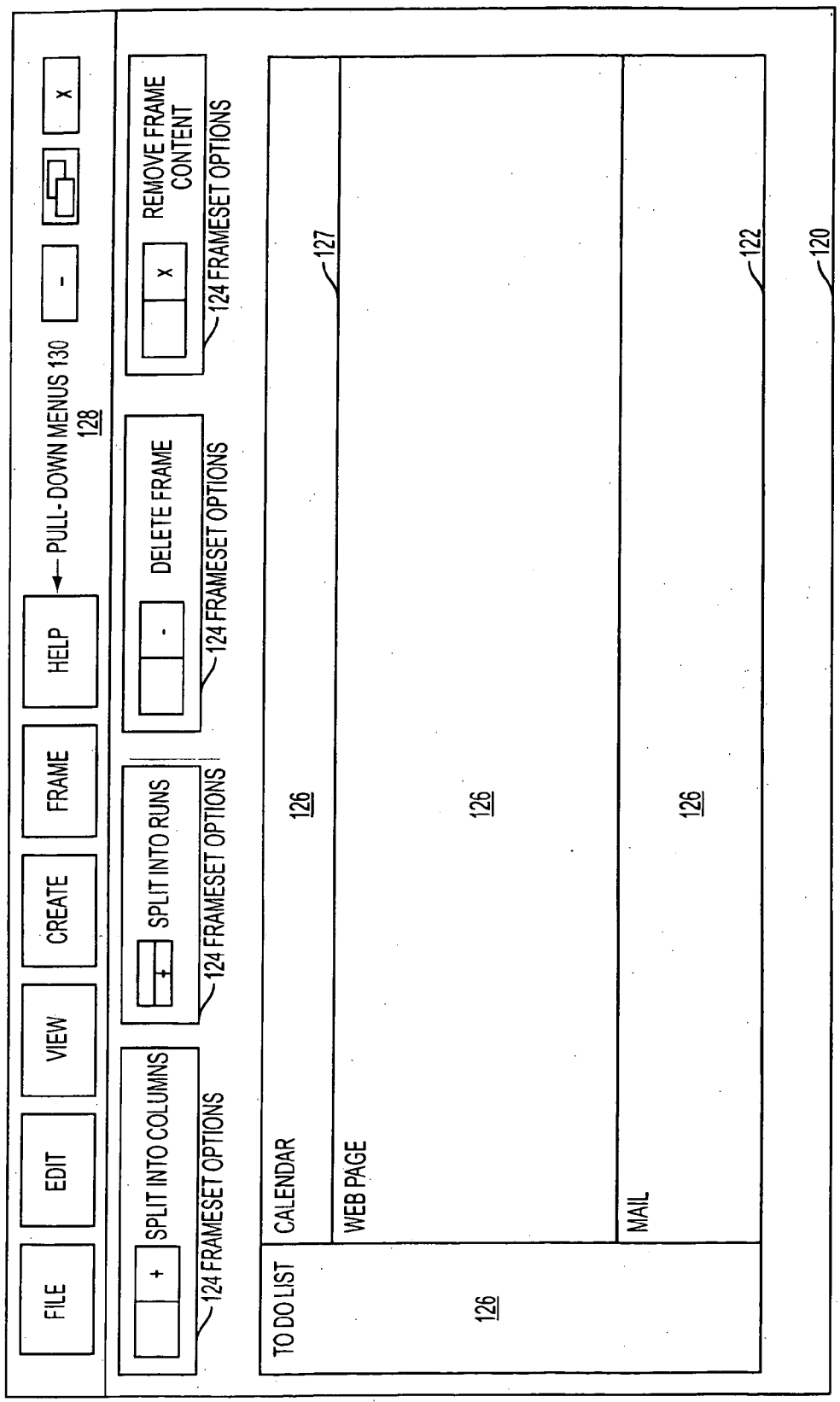
FIG. 2 is a schematic diagram of a graphical user interface in accordance with one embodiment of the present invention.

Once the user selects the frameset arrangement, the user may be presented with a graphical user interface to enable the user to specify content for the frames and to manipulate the arrangement of frames within the view. FIG. 2 depicts one embodiment of such a GUI.

FIG. 2 illustrates a graphical user interface (GUI) 120 in accordance with one embodiment of the invention. GUI 120 may be used in accordance with the system of the present invention to further customize a frameset 122. For example, GUI 120 may comprise one or more frameset option buttons 124. Frameset option buttons 124 may be used to enable a user to customize individual frames 126 within GUI 120. For example, frameset options may include a "Split into columns," "Split into rows," "Delete frame," and "Remove frame content options." If the "Split into columns" frameset option 124 is selected after selecting a frame 126 (e.g., by using a conventional computer mouse), the selected frame 126 is divided into two or more columns. Similarly, if "Split into rows" frameset option 124 is selected after frame 126 is selected, the selected frame 126 is divided into two or more rows. "Delete frame" may eliminate the selected frame from the view. "Remove frame content options" may remove the content of the selected frame. Other frameset options 124 may also be provided.

Additionally, the properties of frame 126 and frameset 122 may also be customized using window 128. For example, window 128 may be provided with pull-down menus 130 which may include a "Frame"-"Frame (or Frameset) Properties" option. Selection of one of these options enables a user to further customize frameset 122 or frames 126. For example, a user may specify an information source for a particular frame, the title of the frameset, etc.

The user may also manipulate the size of frames by selecting a border and dragging that border until the frame is sized as the user desires. For example, in FIG. 2, the user may desire to have the calendar frame larger than depicted and may therefore grab border 127 and drag it downward, thus increasing the size of the "calendar" frame and decreasing the size of the "web page" frame. Known methods of manipulating the size of windows may be applied to manipulating the size of frames within a view according to the present invention.

Further, the user may select the content of frames by selecting the frame and using menus or other options to specify the source of a document to be presented in the frame. The user may select web documents and non-web documents, as depicted in FIG. 2, wherein web documents are presented in the web page frame and non-web documents are presented in the "to-do-list" frame, the "calendar" frame, and the "mail" frame.

Other standard graphical user interface functions, such as those provided by Lotus Notes™ or Windows™, may also be graphically displayed within window 128 and GUI 120. For example, window 128 and GUI 120 may comprise "OK" and "Cancel" buttons for submitting a request for a frameset to be created or canceling a frameset request, respectively. A "Help" button and "Close" button may also be displayed for enabling a user to request assistance with a function featured in window 128 and GUI 120 or to close the window. Other fields and functions may also be displayed.

Figure 3:
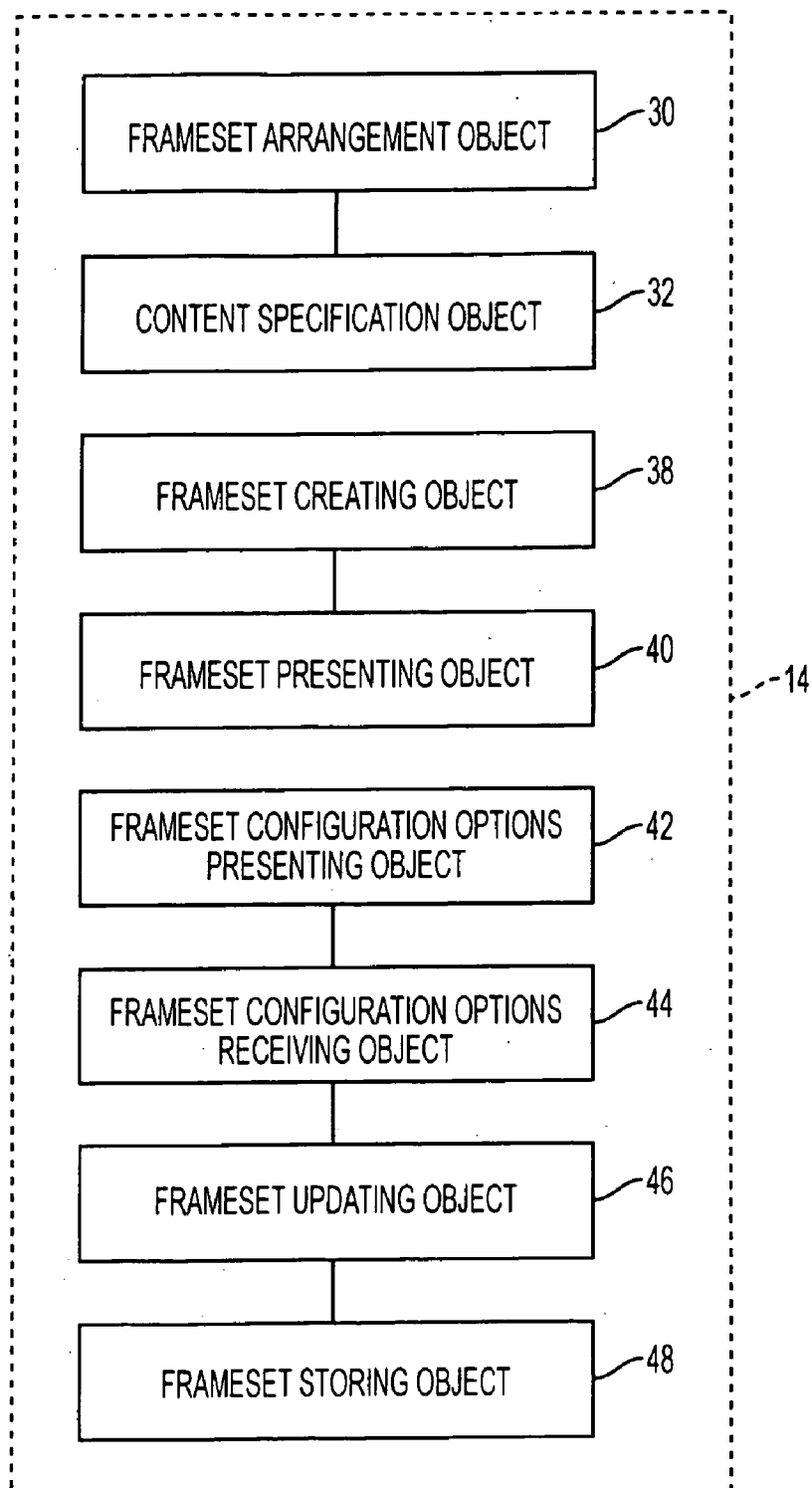
FIG. 3 is a schematic diagram of a system for customizing views in accordance with one embodiment of the present invention.

A customizing system 14 for realizing these functions may be provided. A customizing system 14 in accordance one an embodiment of the invention is shown in FIG. 3. Customizing system 14 may comprise one or more objects to perform various functions. These objects may include a frameset arrangement object 30, a content specification object 32, a frameset creating object 38, a frameset presenting object 40, a frameset configuration options presenting object 42, a frameset configuration options receiving object 44, a frameset updating object 46, and a frameset storing object 48. The objects, depicted in FIG. 3, as being part of customizing system 14 may cooperate to facilitate the creation of framesets within a view of a non-web based computer application and/or an application presenting non-web documents.

Frameset arrangement object 30 may be provided to enable a system user to specify a frameset arrangement for a view as described above. This object may present a GUI, access data storage for available predefined arrangements, and perform other functions as described above for enabling selection of frameset arrangements. Content specification object 32 may enable a user to specify one or more documents for each frame in the frameset. The document may be a web document or a non-web document and may be specified by name, by a link or other reference, by an address or by any other method to indicate what document is to be presented in the selected frame. Frameset creating object 38 may be used to create a frameset in accordance with the arrangement selected by the user. The frameset created based upon the user's selection may be presented using frameset presenting object 40 and may contain content specified by content specification object 32. Frameset configuration options presenting object 42 may be used to present additional options to the user for customizing the frameset as described above (e.g., split a column into two or more columns, delete a frame, etc.). Frameset configuration options receiving object 44 may be used to receive options selected by the user and initiating the requested options. If modifications are made to a frameset, a frameset updating object 46 may be used to update the frameset in accordance with the additional options selected by the user. Frameset storing object 48 may be used to store a newly created or edited frameset in a database.

It should be understood that although multiple objects are described as forming customizing system 14, such objects may also be independent of customizing system 14 and reside on different portions of a computer system. Also, the function performed by several different objects as described herein may be performed by a single object within a computer system. The functions described as being performed by an object may also be altered or performed by multiple objects. Additionally, the invention may be carried out for customizing framesets for web-based and non-web-based computer applications. Further, customizing system 14 may be provided on a computer readable storage medium and loaded onto a client. Other modules of customizing system 14 may also be provided on a computer readable storage medium.

From a system user perspective, customizing system 14 enables a user to create framesets which present information in a view in a particular arrangement. Rather than viewing information in an arrangement presented by a computer program, a user may select the arrangement for a particular view and the information desired to be presented in each portion of the view, without restriction to size, location, order, source, etc. from which the information is presented.

A user may accomplish this by requesting that a new frameset be created using frameset arrangement object 30 (e.g., by selecting "Create"-"Design"-"Frameset" from a pull-down menu of a computer program using a conventional computer mouse). The user may then be presented with, for example, a "Create New Frameset" window (shown in FIGS. 1 and 1A). The window may provide a user with a variety of options for a basic frameset to be created (e.g., general layout, number of frames, etc.). The user may select the arrangement of the frameset, for example, by using a computer mouse or keyboard and selecting the desired arrangement using conventional techniques (e.g., radio buttons, pull-down menus, etc.). After selecting the basic frameset, the user may submit the frameset to the system (e.g., by using a computer mouse to select an "OK" button located in the window). The user may then be presented with a GUI (shown in FIG. 2) using frameset presenting object 38.

The GUI may display, using frameset configuration options presenting object 40 for example, various frameset configuration options enabling the user to further customize the frameset. The user may provide additional customization or store the frameset as displayed. For example, the user may assign properties to individual frames within a frameset. Properties may include a particular information source, frame height, width, margins, spacing, etc. The user may also assign properties to the entire frameset (e.g., name, title, etc.) This may be achieved, for example, by selecting "Frame"-"Frame (or Frameset) Properties" in a pull-down menu of computer program running customizing system 14. Other modes of selection are also possible.

After creating the frameset, the user may store the frameset, assign the frameset to be used when displaying particular views or create a new view to be displayed using that frameset. This may also be accomplished by selecting appropriate options from, for example, standard pull-down menus of a computer program running customizing system 14 or in some other known fashion.

Figure 4:
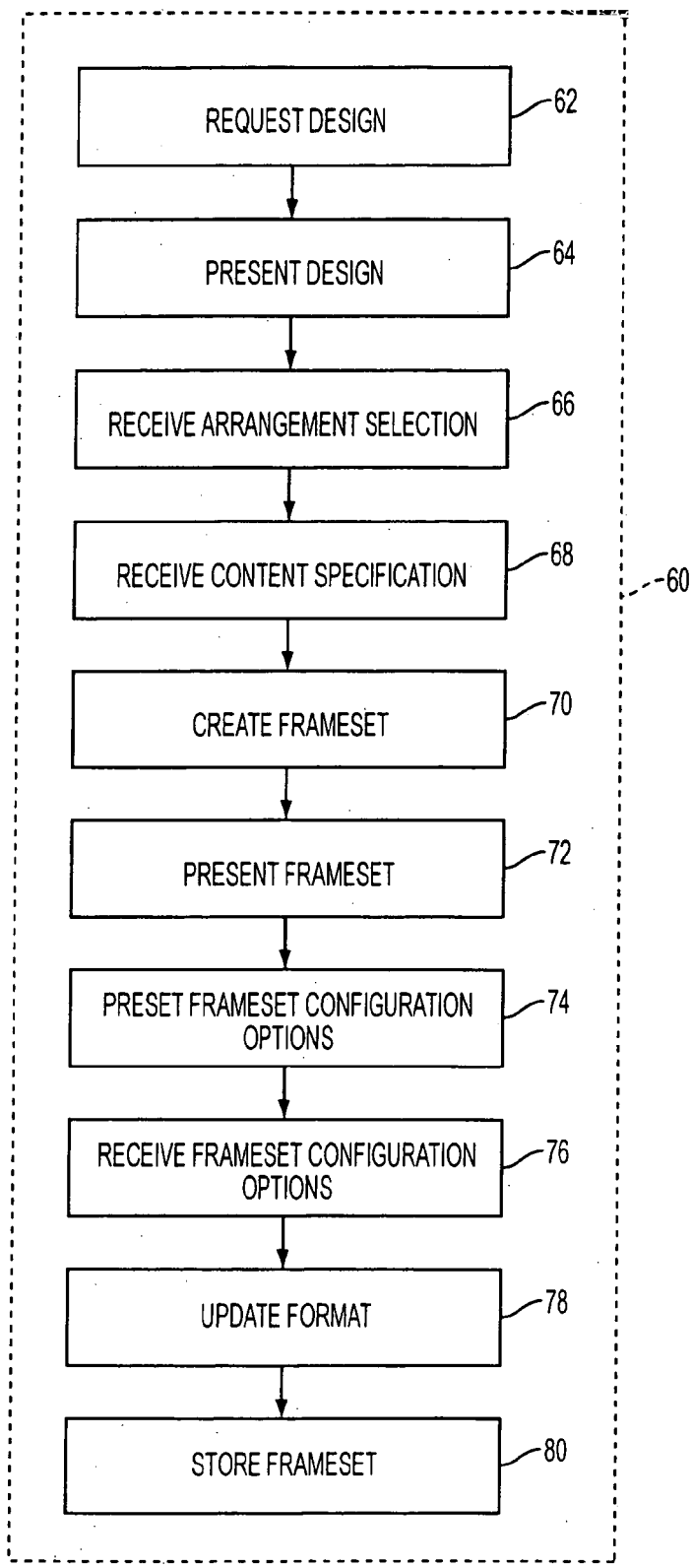
FIG. 4 is a schematic diagram of a method for customizing views in accordance with one embodiment of the present invention.

A method 60 of customizing a frameset according to one embodiment of the invention is described with reference to FIG. 4. Method 60 may comprise multiple steps that may be performed for customizing a frameset in a web-based or non-web-based computer application. According to one embodiment, method 60 includes receiving a request from a user for a frame design for a view in step 62. The frameset design may be presented to a user in step 64. The frameset design may offer a user options relating to the general layout of the frameset as described above. In step 66, the system receives selection of an arrangement selection and then, in step 68, the user may specify the content for each frame of the frameset. A submit content specifications are received from the user. In step 70, customizing system 14 may create a frameset in accordance with the user's selections using. The created frameset may then be presented to the user in step 72. In step 74, the user is provided with additional options for customizing the frameset. For example, the user may be provided with options to customize the width, height, number of frames, etc. In step 76, user options selected by the user are received and acted upon. In step 78, the system updates the frameset in accordance with the options selected by the user. Whether modifications are made to a frameset, a step 80 may be used to store a frameset in a database for later retrieval (e.g., for editing) or to assign to a particular view.

In a preferred embodiment, the system is operated on a conventional client/server computer system comprising one or more clients connected over a network to one or more databases in a server. It is to be understood, however, that the computer system may comprise a single personal computer or any other configuration running a program in which a user may customize framesets. The network may comprise any communication network such as a wireless system or a wired system such as cable, telephone, fiber optics, lines or some other wired communication system.

Further, in one embodiment, the system, method, and computer readable medium may comprise a portion of the computer system licensed under the name Lotus Notes R5™ by Lotus Development Corporation.

Other embodiments and uses of the invention will be apparent to those skilled in the art from consideration of the specification and practice of the invention disclosed herein. The specification and examples should be considered exemplary only. The scope of the invention is only limited by the claims appended hereto.

What is claimed is:

1. A system for enabling a user to create a frameset arrangement for a view comprising:
    a frameset arrangement presentation object that simultaneously displays a plurality of predefined frameset arrangements to the user through a graphical user interface, wherein the plurality of predefined frameset arrangements are displayed as objects to the user;
    a frame number specification object that enables the user to specify at least a first number of frames or a second number of frames in the plurality of predefined frameset arrangements, the first number of frames being different than the second number of frames;
    a frameset selection object that enables the user to select one of the plurality of predefined frameset arrangements through the graphical user interface; and
    a view presentation object that presents the view to the user having the predefined frameset arrangement selected;
    wherein in response to the user specifying the first number of frames, the frameset arrangement presentation object presents the plurality of predefined frameset arrangements, each having the first number of frames specified by the user, and
    wherein in response to the user specifying the second number of frames, the frameset arrangement presentation object presents the plurality of predefined frameset arrangements, each having the second number of frames specified by the user.

2. The system of claim 1, wherein the frameset arrangement presentation object simultaneously displays a plurality of icons, each icon representing one of the plurality of predefined frameset arrangements.

3. The system of claim 2, wherein the frameset selection object comprises the plurality of icons displayed by the frameset arrangement presentation object so that the user may select an icon to select the predefined frameset arrangement that the icon represents.

4. The system of claim 1, wherein the frameset arrangement comprises specification of a size of each frame.

5. The system of claim 1, wherein the frameset arrangement comprises specification of a location of each frame within the view.

6. A system for enabling a user to create a frameset arrangement for a view comprising:
    means for simultaneously displaying a plurality of predefined frameset arrangements to the user through a graphical user interface, wherein the plurality of predefined frameset arrangements are displayed as objects to the user;
    means for enabling the user to specify at least a first number of frames or a second number of frames in the plurality of predefined frameset arrangements, the first number of frames being different than the second number of frames;
    means for enabling the user to select one of the plurality of predefined frameset arrangements through the graphical user interface; and
    means for presenting the view to the user having the selected predefined frameset arrangement;
    wherein in response to the user specifying the first number of frames, the means for simultaneously displaying the plurality of predefined frameset arrangements presents each of the plurality of predefined frameset arrangements with the first number of frames specified by the user, and
    wherein in response to the user specifying the second number of frames, the means for simultaneously displaying the plurality of predefined frameset arrangements presents each of the plurality of predefined frameset arrangements with the second number of frames specified by the user.

7. The system of claim 6, wherein the means for simultaneously displaying the plurality of predefined framesets simultaneously displays a plurality of icons, each icon representing one of the plurality of predefined frameset arrangements.

8. The system of claim 7, wherein the means for enabling the user to select one of the plurality of predefined frameset arrangements comprises the plurality of icons displayed by the means for simultaneously displaying the plurality of predefined frameset arrangements so that the user may select one of the plurality of icons to select the predefined frameset arrangement that the icon represents.

9. The system of claim 6, wherein the predefined frameset arrangement comprises specification of a size of each frame.

10. The system of claim 6, wherein the predefined frameset arrangement comprises specification of a location of each frame within the view.

11. A method for enabling a user to create a frameset arrangement for a view comprising the steps of:
    simultaneously displaying a plurality of frameset arrangements to the user through a graphical user interface, wherein the plurality of predefined frameset arrangements are displayed as objects to the user;
    enabling the user to specify at least a first number of frames or a second number of frames in the plurality of predefined frameset arrangements, the first number of frames being different than the second number of frames;
    enabling the user to select one of the plurality of predefined frameset arrangements through the graphical user interface; and
    presenting the view to the user having the selected predefined frameset arrangement;
    wherein if the user specifies the first number of frames, the plurality of predefined frameset arrangements are each displayed with the first number of frames specified by the user, and
    wherein if the user specifies the second number of frames, the plurality of predefined frameset arrangements are each displayed with the second number of frames specified by the user.

12. The method of claim 11, further comprising the step of simultaneously displaying a plurality of icons, wherein each icon represents one of the plurality of predefined frameset arrangements.

13. The method of claim 12, further comprising the step of enabling the user to select one of the plurality of icons to select one of the plurality of predefined frameset arrangements that the icon represents.

14. The method of claim 11, wherein the predefined frameset arrangement specifies a size of each frame.

15. The method of claim 11, wherein the predefined frameset arrangement specifies a location of each frame within the view.

16. A processor readable medium having processor readable code embodied therein for causing a processor to enable a user to create a frameset arrangement for a view, the medium comprising:
  processor readable code for causing the processor to simultaneously display a plurality of predefined frameset arrangements to the user through a graphical user interface, wherein the plurality of predefined frameset arrangements are displayed as objects to the user;
  processor readable code for causing the processor to enable the user to specify at least a first number of frames or a second number of frames in the plurality of predefined frameset arrangements, the first number of frames being different than the second number of frames;
  processor readable code for causing the processor to enable the user to select one of the plurality of predefined frameset arrangements through the graphical user interface; and
  processor readable code for causing the processor to present the view to the user having the selected predefined frameset arrangement;
  wherein in response to the user specifying the first number of frames the processor readable code further causes the processor to present each of the plurality of predefined frameset arrangements with the first number of frames specified by the user, and
  wherein in response to the user specifying the second number of frames the processor readable code further causes the processor to present each of the plurality of predefined frameset arrangements with the second number of frames specified by the user.

17. The medium of claim 16, wherein the processor readable code further causes the processor to simultaneously display a plurality of icons, each icon representing one of the plurality of predefined frameset arrangements.

18. The medium of claim 17, wherein the processor readable code further causes the processor to enable the user to select one of the plurality of icons and thereby select the predefined frameset arrangement that the selected icon represents.

19. The medium of claim 16, further comprising processor readable code for causing the processor to specify a size of each frame.

20. The medium of claim 16, further comprising processor readable code for causing the processor to specify a location of each frame within the view.

21. A method for enabling a user to customize a workspace, the method comprising:
  storing a plurality of predefined framesets, wherein each of the plurality of predefined framesets includes a predefined number of frames and a predefined layout for the frames;
  simultaneously displaying a plurality of user selectable graphical interface objects, wherein each user selectable graphical interface object includes a graphical representation of a corresponding one of the plurality of predefined framesets, wherein said graphical representation includes the corresponding predefined number of frames and the corresponding predefined layout for the frames, wherein the graphical representations of the plurality of user selectable graphical interface objects are displayed together in a user interface;
  enabling the user to specify a number of frames that are displayed for the plurality of predefined framesets;
  in response to the user specifying the number of frames, retrieving one or more of the plurality of predefined framesets, wherein each of the one or more of the plurality of predefined framesets includes the specified number of frames;
  selecting one of the plurality of user selectable graphical interface objects thereby enabling the user to select said corresponding one of the plurality of predefined framesets; and
  presenting the selected corresponding one of the plurality of predefined framesets.

22. The method claim 21, further comprising:
  enabling the user to modify the selected predefined frameset.

23. The method claim 21, wherein at least one frame of said each frameset includes a non-web document.

24. The method claim 21, wherein said each frameset includes at least one frame for inputting a web document and at least one frame for inputting a non-web document.

* * * * *